United States Patent

Stevens et al.

[11] Patent Number: 5,543,472
[45] Date of Patent: Aug. 6, 1996

[54] CONCURRENT EPOXIDATION AND CATALYST RESIDUE EXTRACTION

[75] Inventors: Craig A. Stevens; Bhaskar P. Rao; Cary A. Veith, all of Houston; James R. Erickson, Katy, all of Tex.

[73] Assignee: Shell Oil Company, Houston, Tex.

[21] Appl. No.: 442,520

[22] Filed: May 16, 1995

[51] Int. Cl.$^6$ ............................................ C08F 8/08
[52] U.S. Cl. ................. 525/387; 525/331.9; 525/332.1; 525/333.2; 525/360; 525/366; 525/369; 538/488; 538/489; 538/499
[58] Field of Search ..................... 528/489; 525/387, 525/369

[56] References Cited

U.S. PATENT DOCUMENTS

| | | | |
|---|---|---|---|
| 4,471,099 | 9/1984 | Trepka | 525/338 |
| 4,952,304 | 8/1990 | Timms | 208/251 R |
| 5,229,464 | 7/1993 | Erickson . | |
| 5,247,026 | 9/1993 | Erickson | 525/331.9 |

Primary Examiner—Fred Zitomer
Attorney, Agent, or Firm—Donald F. Haas

[57] ABSTRACT

A process for the concurrent epoxidation of, and catalyst residue extraction from, anionically polymerized diene-containing polymers which have been hydrogenated using a Group VIII metal catalyst, said process comprising:

(a) introducing a catalyst residue-containing diene-containing polymer cement into a reactor,
(b) heating the polymer cement to a temperature of 25° to 65° C.,
(c) contacting the polymer cement with a caustic solution,
(d) contacting the polymer cement with a peracid solution,
(e) mixing the polymer, caustic, and acid at 25° to 65° C. for ½ to 3 hours,
(f) optionally adding sufficient caustic solution to neutralize excess acid while continuing the mixing,
(g) adding sufficient water such that the aqueous/organic phase weight ratio is from 0.2:1 to 1:1 while continuing the mixing,
(h) allowing the phases to settle for 5 to 90 minutes,
(i) removing the aqueous phase from the reactor,
(j) optionally repeating steps (g), (h), and (i) until the catalyst residue contents are less than 10 ppm, and
(k) removing the polymer cement from the reactor and removing the solvent to recover the epoxidized polymer.

3 Claims, No Drawings

CONCURRENT EPOXIDATION AND CATALYST RESIDUE EXTRACTION

BACKGROUND OF THE INVENTION

This invention relates to processes for epoxidizing diene-containing polymers and removing hydrogenation catalyst residue therefrom. More specifically, the present invention relates to a process for the concurrent epoxidation of, and hydrogenation catalyst residue extraction from, anionically polymerized diene-containing polymers which have been partially hydrogenated.

The hydrogenation or selective hydrogenation of conjugated diene polymers has been accomplished using any of the several hydrogenation processes known in the prior art. For example, the hydrogenation has been accomplished using methods such as those taught, for example, in U.S. Pat. Nos. 3,494,942; 3,634,594; 3,670,054; 3,700,633 and Re. 27,145, the disclosure of which patents are incorporated herein by reference. These methods known in the prior art for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising a Group VIII metal.

In the method described in the foregoing patents, a catalyst is prepared by combining a Group VIII metal, particularly nickel or cobalt, compound with a suitable reducing agent such as an aluminum alkyl. Also, while aluminum alkyls are the preferred reducing agents, it is known in the prior art that alkyls and hydrides of metals of Groups I-A, II-A and III-B of the Periodic Table of the Elements are effective reducing agents, particularly lithium, magnesium and aluminum. In general, the Group VIII metal compound is combined with Group I-A, II-A or III-B metal alkyl or hydride at a concentration sufficient to provide Group I-A, II-A and/or III-B metal to Group VIII metal ratios within the range from bout 0.1/1 to about 20/1, preferably from about 1/1 to about 10/1. As indicated in the foregoing patents, the hydrogenation catalyst is generally prepared by combining the Group VIII metal compound and the reducing agent in a suitable solvent or diluent at a temperature within the range from about 20° C. to about 60° C. before the catalyst is fed to the hydrogenation reactor.

Epoxidation of diene-containing polymers is known and it is known that epoxidation can be effected by generally known methods such as by reaction with organic peracids which can be preformed or formed in situ. Suitable known preformed peracids include but are not limited to peracetic, performic, and peroxybenzoic acids. Epoxidation may also be accomplished by treatment of the polymer with hydroperoxides in the presence of transition metals such as Mo, W, Cr, V, Mn, and Ag. Epoxy functionality may also be created by direct oxidation of ethylenic unsaturation by $O_2$ in the presence of tetra cyanoethylene.

Heretofore, the two process steps of catalyst removal and epoxidation have been carried out as separate reaction steps and in separate reaction vessels. The reasons why these two process steps have been separate are (1) they are typically performed sequentially and (2) they have required different raw materials and process conditions. It would be highly advantageous to provide a process wherein these two steps were combined so that the same reactor could be used, the raw materials, i.e., solvent and oxidizing agents, epoxidizing agents and neutralization agents, usage could be reduced, and that overall batch cycle time and process equipment could be reduced. The present invention provides a process which gives these advantages.

SUMMARY OF THE INVENTION

The present invention provides a process for the concurrent epoxidation of, and catalyst residue extraction from, anionically polymerized diene-containing polymers which may contain a vinyl aromatic hydrocarbon and which have been partially hydrogenated with a Group VIII catalyst. This process comprises the following steps:

(a) introducing a catalyst residue-containing diene-containing polymer (with or without polystyrene) cement into a reactor, (b) heating the polymer cement to a temperature of 25° to 65° C., (c) contacting the polymer cement with a caustic solution, (d) contacting the polymer cement with a peracid solution, (e) mixing the polymers, caustic, and acid at 25° to 65° C. for ½ to 3 hours, (f) optionally adding sufficient additional caustic solution to neutralize excess acid while continuing the mixing, (g) adding sufficient water such that the aqueous/organic phase weight ratio is from 0.2:1 to 1:1 while continuing the mixing, (h) allowing the phases to settle for at least 5 to 90 minutes, (i) removing the aqueous phase from the reactor, (j) optionally repeating steps (g), (h), and (i) until satisfactory levels of metallic and ionic species are present in the polymer solution. Preferably, the concentrations should be less than 10 ppm Ni (solution basis) and less than 10 ppm Al (solution basis), (k) removing the polymer cement from the reactor and removing the solvent to recover the epoxidized polymer.

The preferred caustic for use herein is selected from the group consisting of Group I alkali metal hydroxides, carbonates, and bicarbonates. The preferred peracid is peracetic acid. The preferred polymers are copolymers of conjugated dienes, especially butadiene and isoprene. The preferred polymers may contain a vinyl aromatic hydrocarbon.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, graft, block or a combination of these, as well as linear, star or radial.

These polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet, a melt, or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group I-A metals, their alkyls, amides, silanolates, napthalides, biphenyls and anthracenyl derivatives. It is preferred to use an organoalkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_a$$

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefinalkenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference.

In general, linear and branched block copolymers which may be used in the present invention include those which may be represented by the general formula:

$$A_z\text{—}(B\text{—}A)_y\text{—}B_x$$

Wherein:

A is a linear or branched polymeric block comprising predominantly monoalkenyl aromatic hydrocarbon monomer units;

B is a linear or branched polymeric block containing predominantly conjugated diolefin monomer units;

x and z are, independently, a number equal to 0 or 1;

y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference.

In the production of all of the polymers described above, the polymerization is preferably terminated by utilizing hydrogen gas in place of the conventionally used alcohol terminating agent. This method is described in detail in U.S. Pat. No. 5,143,990 which is herein incorporated by reference.

The polymers treated according to the process of this invention are hydrogenated conjugated diolefin polymers. If the diene is copolymerized with a vinyl aromatic hydrocarbon, either randomly or blocky, the hydrogenation process will selectively hydrogenate the diene without hydrogenating alkenyl aromatic hydrocarbon to any degree. Hydrogenation percentages of greater than 50% are easily obtained but it has been found that hydrogenation percentages of greater than 95% and 98% can be achieved as well.

In general, the hydrogenation is carded out in a suitable solvent at a temperature within the range of from 0° C. to 120° C., preferably 60° C. to 90° C., and at a hydrogen partial pressure within the range from 1 psig to 1200 psig, preferably from 500 to 800 psig. Nickel is the preferred Group VIII metal because it is inexpensive and capable of high activity hydrogenation of the diene portion of a block copolymer without hydrogenating the polystyrene segments. Aluminum trialkyls, especially aluminum triethyl, are preferred for the reducing agent because they result in a completely soluble, homogeneous catalyst solution. The catalyst solution containing Ni and Al is charged to the polymer solution (which is usually referred to as the polymer cement—it may contain 15 to 30 weight percent of the polymer dissolved or suspended in the solvent) to achieve a Ni concentration of 1 to 200 ppm. Contacting at hydrogenation conditions is generally continued for a period of time within the range from about 30 to about 360 minutes. Suitable solvents for hydrogenation include, among others, n-heptane, n-pentane, tetrahydrofuran, cyclohexane, toluene, hexane and benzene.

It is at this point in the production of the final epoxidized polymer that the process of the present invention begins. The polymer cement contains relatively high concentrations of catalyst residues, i.e. perhaps up to 200 ppm of nickel and 210 ppm of aluminum and up to 1000 ppm lithium. These contaminants are usually removed at this point in a separate step wherein the polymer cement is treated with aqueous sulfuric, phosphoric, or other acids and oxygen. This treatment is repeated several times until the catalyst residue level drops to an acceptable level, such as less than 10 ppm of nickel and less than 10 ppm of aluminum and less than 10 ppm of lithium. The polymer cement is then neutralized, typically with ammonia or Group I alkali metal hydroxides, carbonates, or bicarbonates, and then washed with water.

In the prior art, the polymer would then be epoxidized. Examples of epoxidized diene polymers and methods of their production are found in U.S. Pat. Nos. 5,229,464 and 5,247,026 which are herein incorporated by reference. The epoxidized polymers made according to the above two patents can also be made by the process of the present invention.

According to the present invention, the epoxidation and catalyst residue extraction steps are carried out concurrently.

The anionically polymerized hydrogenated diene-containing polymer is introduced into a reactor in the form of a polymer cement and heated to a temperature of 25° to 65 ° C. The polymer cement is therein contacted with a caustic solution and a peracid solution and those three components are mixed together at a temperature of 25° to 65° C. for a period of ½ to 3 hours. Optionally, sufficient additional caustic solution is added to neutralize excess acid while continuing the mixing. Next, sufficient water is added such that the aqueous/organic phase volume ratio is from 0.2:1 to 1:1 while continuing the mixing to avoid the formation of an emulsion. The phases are then allowed to settle for 5 to 90 minutes and the aqueous phase is removed from the reactor. It is likely that the steps of adding water, allowing the phases to settle, and removing the aqueous phase will have to be repeated at least once and preferably four times to reduce the catalyst residue content to a desired level of less than 10 ppm of nickel, less than 10 ppm of aluminum, less than 10 ppm of lithium, less than 10 ppm of sodium, and to obtain an overall conductivity of 100 to 200 μmho/cm or less in the decanted wash water. It is preferred to produce an epoxidized polymer cement with minimum concentration of metals and minimum conductivity. Finally, the polymer cement is removed from the reactor and the solvent is removed from the polymer cement to recover the epoxidized polymer that is visually appealing and contains a minimum of recalcitrant impurities.

Suitable caustic solutions which can be used in the process of the present invention include sodium hydroxide, sodium carbonate, sodium bicarbonate, and similar Group I alkali metal analogs. Sodium hydroxide is preferred because it is readily available, functional and inexpensive. A peracid is a derivative of hydrogen peroxide made by oxidizing an organic acid. Suitable peracids which can be used in the present invention include peracetic acid, performic acid, and perbenzoic acid. Peracetic acid is preferred because of its reactivity, moderate vapor pressure, and because its reaction by-product, acetic acid, is easily removed from the polymer.

It is important to mix the polymer cement, caustic solution, and acid solution together at the prescribed temperature to suppress unwanted side reactions, including the violent decomposition of the peroxide. The mixing time is important to achieve intimate contact of the two phases to help the epoxidation reaction. The volume ratio range of aqueous to organic phases is important to avoid emulsions and yet to extract both organic and inorganic impurities. The phases should be allowed to settle for the prescribed period of time because detection of the interface between the two phases requires good phase separation. The addition and quantity of the caustic solution is important both to neutralize the sulfuric acid in the peracid solution so that unwanted crosslinking of the polymer is avoided and to buffer the mixture so that undesired side reactions are reduced.

DESCRIPTION OF THE PREFERRED EMBODIMENT

PROCEDURE FOR THE EPOXIDATION OF NICKEL-LADEN POLYMER CEMENTS

NICKEL EXTRACTION & EPOXIDATION

Charge nickel-laden polymer-precursor cement into the reactor

Turn mixer on and set rate of 20 to 60 RPM

Heat reactor contents to a temperature of 50° C.

Charge 1st part (usually less than ½) of caustic solution used to neutralize sulfuric acid in peracid assay Charge 1st ½ of peracetic acid solution over approximately 15 to 90 minutes to control temperature of reaction Charge remainder of caustic solution used to neutralize sulfuric acid and partially neutralize acetic acid Charge 2nd ½ of peracetic acid solution over approximately 15 minutes to control temperature of reaction Maintain reaction at a temperature of 50° C. for 1.0 to 2.5 hours Take samples from reactor to track extent of epoxidation reaction

NEUTRALIZATION—OPTIONAL

After the target level of epoxidation has been reached:
  Keep mixer on at rate of 20 to 60 RPM
  Charge caustic solution used to neutralize acetic acid (@ 5% molar excess)
  Charge deionized water to bring aqueous/organic volume ratio to 1:1, preferably 0.4:1
  Maintain mixing for 30 minutes
  Turn mixer off
  Allow to settle for 60 minutes if good phase separation, perhaps longer
  Remove aqueous phase (bottom phase) from reactor

WATER WASH—AT LEAST THREE (3) TIMES

Charge deionized water to bring aqueous/organic volume ratio of 0.4:1 to 1:1

Turn mixer on and set rate of 20 to 60 RPM

Maintain mixing for 30 minutes if good phase separation, perhaps longer

Turn mixer off

Allow to settle for 20 to 30 minutes

Remove aqueous phase (bottom phase) from reactor

Take sample of aqueous phase—if the nickel content is more than 10 ppm or conductivity is more than 200 μmho/cm, wash again

ADD ANTIOXIDANT

Charge antioxidant/cyclohexane solution

Turn mixer on and set rate of 20 to 60 RPM

Maintain mixing for 30 minutes

Turn mixer off

Remove polymer cement from reactor—send to solvent removal

EXAMPLES

Example 1

Star Polymer With Neutralization—EP-0244

1550 grams of a polymer cement containing 30 percent by weight star polymer, 10 percent diethylether, and balance cyclohexane with a nickel/aluminum catalyst (at 20 ppm nickel) was introduced into a 5000 milliliter baffled flask. The star polymer was composed of polyisoprene-polybutadiene arms, coupled with divinyl benzene. Prior to hydrogenation, the molecular weights of the uncoupled and coupled species were 5430 and 56,900 g/mol (per gel permeation chromatography (GPC)), respectively. The composition of the polymer prior to hydrogenation was 16 weight percent isoprene, 78 percent butadiene and 6 weight percent divinyl benzene. The residual olefinic unsaturation in the partially hydrogenated polymer was 1.26 milliequivalents/gram, as measured by nuclear magnetic resonance (NMR) spectroscopy. The polymer cement, which already contained antioxidant, was then heated to 50° C. The mixing was provided by an anchor paddle on a rotating shaft. Six grams of a 7.9 percent solution of sodium hydroxide in water was added to the polymer cement.

Next, 29 grams of the peracetic acid solution was added to this mixture drop by drop to control the temperature of the flask's contents. The peracetic acid solution was composed of 35 weight percent peracetic acid, 39 weight percent acetic acid, 1 weight percent sulfuric acid, 5 weight percent hydrogen peroxide, and 20 weight percent water (as provided from a commercial supplier). The mixture foamed and heat was generated so the heating was discontinued and nitrogen was blown in to keep the temperature constant. The cement, which was originally half black, turned to grey.

After the addition of the peracetic acid solution was completed, 5.5 grams of the same sodium hydroxide solution was added to the mixture. Then 29 grams of peracetic acid solution was added to the mixture drop by drop and the preceding procedure repeated to maintain temperature. The total amount of peracetic acid solution added in the step was 58 grams.

After the entire mixture had been reacting for approximately one hour, heating was discontinued and the mixture was cooled. Mixing was stopped and 1970 grams of 1.37 weight percent sodium hydroxide in water solution were added to the flask to both neutralize the excess acid and add the required water to attain a 1:1 volume ratio of organic and aqueous phases. After mixing for 30 minutes and stopping the agitator, the phases separated within 2 minutes. After 17 hours (overnight), the water phase was removed and analyzed for pH (12.5) and conductivity (22.5 millimho/cm). The water washing step was performed five times as the conductivity dropped to 687, 175, 140, 124 and 106 micromho/cm. The pH of the final wash water was 7. The polymer then was removed from the flask and the solvent was removed by vacuum distillation.

The final epoxidized polymer had an epoxy content of 0.40 milliequivalents of epoxy per gram of polymer. The polymer cement contained 6 ppm of nickel, 7 ppm of aluminum and 95 ppm sodium. The dried polymer was clear, translucent and visually appealing, indicating little presence of inorganic impurities.

Example 2

Star Polymer With Neutralization—EP-0245

The procedure of Example 1 was repeated with 1550 grams of a 30 percent solids polymer cement of the same polymer. 10.75 grams of a 1 normal sodium hydroxide solution was added, followed by dropwise addition of 58 grams of the peracetic acid solution. After that was completed, 11 grams of the 1 normal sodium hydroxide solution was added and 58 grams of peracetic acid was added dropwise. The components were allowed to react for one hour, then the flask and its contents were cooled.

Then 108 grams of a 50 percent sodium hydroxide solution and 1246 grams of water were added to the flask and mixed for 30 minutes. After 14 hours (overnight), this mixture settled into two phases. The water phase was removed and 1940 grams of water mixed for 30 minutes. The phases were allowed to settle for 60 minutes and then separated. This water washing step was repeated four times as the conductivity of each dropped to 333, 115, 109, and 53 micromho/cm. The pH of the final wash water was 7. The polymer cement was removed from the flask and the solvent removed from the polymer. The final polymer had an epoxy content of 0.87 milliequivalents of epoxy per gram of polymer.

Example 3

Linear Polymer With Primary Hydroxyl Without Neutralization—EP-0358

703 grams of a polymer cement, containing 22.4 percent by weight polymer, 6 percent diethylether and balance cyclohexane and nickel/aluminum catalyst residues, was introduced into a 2000 milliliter baffled flask. The polymer was composed of polyisoprene-copolybutadiene/copolystyrene-polybutadiene blocks, capped with ethylene oxide, terminated with an alcohol and partially hydrogenated to saturate the olefinic species residing in the polybutadiene region. The total molecular weight (via GPC) and composition (via NMR) of the polymer prior to hydrogenation was 6140 grams/mol, 39 weight percent isoprene, 21 weight percent butadiene and 40 weight percent styrene respectively. The residual olefinic unsaturation in the polymer (predominately 1,4-isoprene mers) was 1.7 milliequivalents/gram per NMR. The cement contained 26 ppm nickel, 26 ppm aluminum, 310 ppm lithium and no sodium (via plasma jet and atomic absorption analyses).

The polymer cement (with no antioxidant) was mixed and heated to 43° C. To the cement, 0.69 grams of 50 weight percent sodium hydroxide was added. Upon slow dropwise addition of 28.2 grams of the peracetic assay used in Example 1, the temperature of the mixed solution reached 55° C. The color of the solution changed from black to grey. The second dose of 7.3 grams of 50 weight percent sodium hydroxide was added and was followed by dropwise addition of 28.2 grams of the peracetic assay. The components were allowed to react for one hour at 50°–53° C., then the flask and its contents were cooled to room temperature to stop the reaction. When the mixer was stopped the aqueous and organic phases separated, the polymer solution was translucent and without black, grey, or green color.

365 grams of deionized water was added and mixed with the flask's contents for 30 minutes. After 30 minutes of settling, the acidic aqueous phase was decanted from the bottom of the flask. The polymer cement was contacted five or more times with the same amount of water in this manner; the waste water was neutralized outside of the reaction flask. The pH and conductivity values of the waste water from each contact were 4.0, 3.5, 3.5, 4.0, 5.0, 6.0 and 12000, 1940, 565, 350, 35, and 120 micromho/cm, respectively. The epoxidized polymer cement contained <0.3 ppm nickel, 1.6 ppm aluminum, 0.2 ppm lithium, and 1.8 ppm sodium. The polymer cement was mixed with antioxidant, removed from the flask and vacuum dried to recover the polymer.

The final neat epoxidized polymer has an epoxy content of 1.5 milliequivalents of epoxy per gram of polymer (via NMR). Furthermore, the final neat epoxidized polymer was clear and visually appealing.

We claim:

1. A process for the concurrent epoxidation of, and catalyst residue extraction from, anionically polymerized diene-containing polymers which have been hydrogenated using a Group VIII metal catalyst, said process comprising:

(a) introducing a catalyst residue-containing diene-containing polymer cement into a reactor, (b) heating the polymer cement to a temperature of 25° to 65° C., (c) contacting the polymer cement with a caustic solution, (d) contacting the polymer cement with a peracid solution, (e) mixing the polymer, and acid at 25° to 65° C. for ½ to 3 hours, (f) optionally adding sufficient caustic solution to neutralize excess acid while continuing the mixing, (g) adding sufficient water such that the aqueous/organic phase weight ratio is from 0.2:1 to 1:1 while continuing the mixing, (h) allowing the phases to settle for 5 to 90 minutes, (i) removing the aqueous phase from the reactor, (j) optionally repeating steps (g), (h), and (i) until the catalyst residue contents are less than 10 ppm, and (k) removing the polymer cement from the reactor and removing the solvent to recover the epoxidized polymer.

2. The process of claim 1 wherein the caustic is sodium hydroxide and the peracid is peracetic acid.

3. The process of claim 1 wherein step (e) includes the additional step of sampling the polymer and determining the epoxy content until the desired epoxy level is reached.

* * * * *